Figure 1:
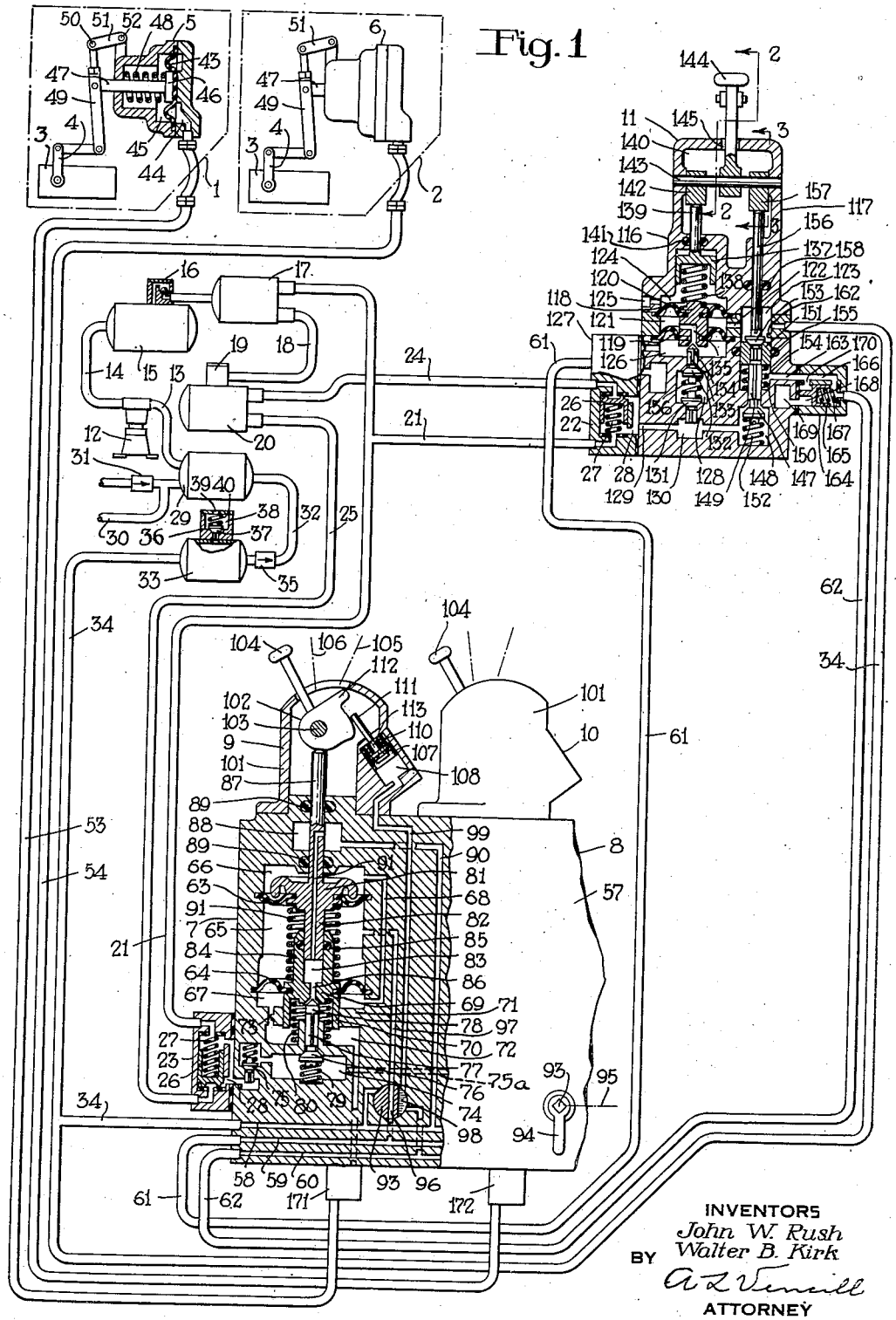

Jan. 6, 1948.  J. W. RUSH ET AL  2,433,925
FLUID PRESSURE CONTROL APPARATUS
Filed May 27, 1943  2 Sheets-Sheet 1

INVENTORS
John W. Rush
Walter B. Kirk
BY
*A. L. Verrill*
ATTORNEY

Jan. 6, 1948.          J. W. RUSH ET AL          2,433,925
                FLUID PRESSURE CONTROL APPARATUS
             Filed May 27, 1943         2 Sheets-Sheet 2
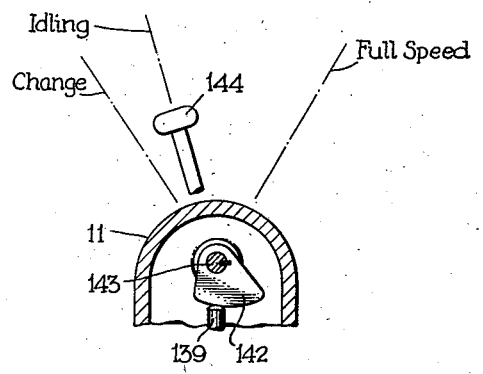
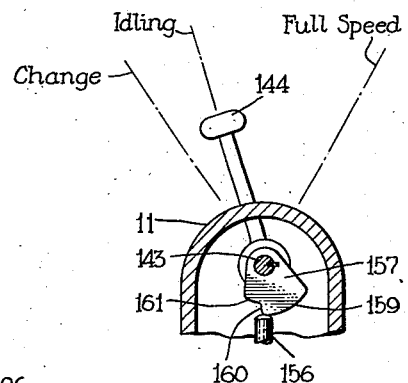
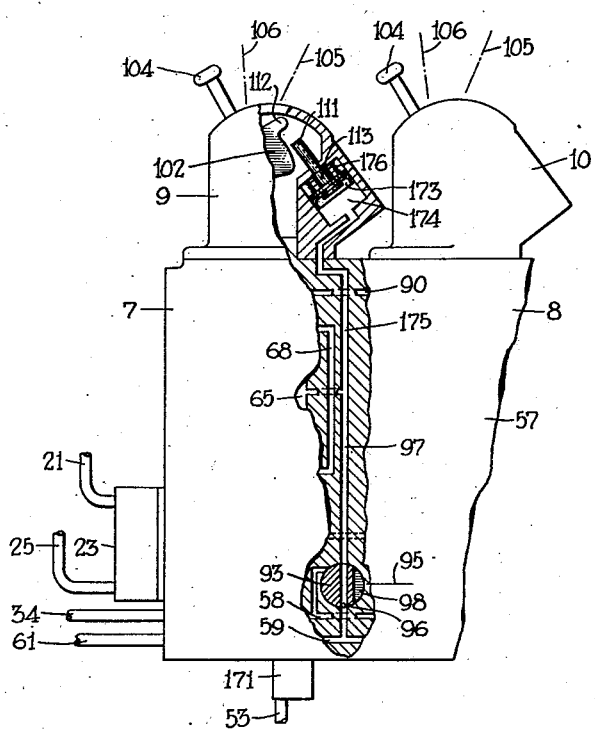
INVENTORS
John W. Rush
Walter B. Kirk
BY
ATTORNEY Patented Jan. 6, 1948

2,433,925

UNITED STATES PATENT OFFICE 2,433,925

FLUID PRESSURE CONTROL APPARATUS

John W. Rush, Wilkinsburg, and Walter B. Kirk, East McKeesport, Pa., assignors to The Westinghouse Air Brake Company, Wilmerding, Pa., a corporation of Pennsylvania Application May 27, 1943, Serial No. 488,638

11 Claims. (Cl. 121—38)

This invention relates to control apparatus and more particularly to the fluid pressure type for governing the operation of devices such as internal combustion engines.

In the copending application of Rankin J. Bush, Serial No. 480,161, filed March 23, 1943, and assigned to the assignees of the present application, there is disclosed a fluid pressure system for governing the operation of one or more internal combustion engines. This system embodies a regulating device for each engine for controlling the speed or power output of the engine, and each of these devices is adjustable by the cooperative effect of fluid under pressure supplied to two different chambers, which may be called main and vernier chambers. The supply of fluid under pressure to these different chambers is controlled from different control stations, which on certain airplanes may be the pilot's control station and the engineer's control station. During flight of the airplane, the system provides for the pilot controlling simultaneously the pressure of fluid in the main control chambers of the several regulating devices and the engineer controlling individually the pressure of fluid in the several vernier control chambers, whereby with the several engines under the control of the pilot the engineer may effect minor adjustments in speed of any one or more of the engines in order to synchronize the speed of the several engines. The pilot may, at will, transfer the control of the speed of the engines to the engineer and, likewise may, at will, take over the control of the speed of the engines. When the speed of the engines is under the control of the engineer, he governs same by varying the pressure of fluid in the main control chambers of the speed regulating devices.

As will now be apparent, each of the above described regulating devices requires a fluid pressure control pipe connected to each of the main and vernier control chambers therein, and one object of the invention is the provision of a simplified fluid pressure control system arranged to accomplish the same results as the system above described and in which the need for the vernier control chambers in the regulating devices and the pipes for connection with said chambers is eliminated. This simplification is desirable not only from the standpoint of cost, maintenance, and weight of the system, but also in that it results in a material reduction in the number of pipes required in the system and a corresponding reduction in the possibility of failure of the system due to pipe breakage.

Other objects and advantages will be apparent from the following more detailed description of the invention.

In the accompanying drawings; Fig. 1 is a diagrammatic view, partly in section and partly in outline, of a fluid pressure control system embodying one form of the invention; Figs. 2 and 3 are sectional views taken on the lines 2—2 and 3—3, respectively, in Fig. 1; and Fig. 4 is a view, partly in section and partly in elevation, of a modification of the invention.

Description

The improved fluid pressure control system provides for the control of speed of any desired number of internal combustion engines, but as shown in the drawings such system is limited, for the purpose of illustration only, to the control of two engines 1 and 2. Each of the engines 1 and 2 is provided with a fuel supply governing means 3 which is adjustable to vary the fuel supply to the respective engine by operation of a lever 4, for thereby regulating the speed or output of the engine.

Fluid pressure controlled regulating devices 5 and 6 are associated with engines 1 and 2, respectively, for governing the adjustment of the respective lever 4. The devices 5 and 6 are arranged for control by control devices 7 and 8, respectively, located at the engineer's control station in the airplane. Associated with the fluid pressure control devices 7 and 8 are engineer's control devices 9 and 10, respectively, whereby the engineer through the medium of the control devices 7 and 8 and regulating devices 5 and 6 may individually control the speed of engines 1 and 2. A pilot's control device 11 located at the pilot's control station in the airplane is provided for controlling through the medium of control devices 7 and 8 the speed of engines 1 and 2, simultaneously. The pilot's control device 11 also embodies transfer means whereby the pilot may, at will, take over from the engineer the main control of speed of engines 1 and 2 and limit the engineer's control of speed to such minor adjustments of each individual engine as required to synchronize the engines. The transfer means also provides for transfer of the main control of speed of the engines 1 and 2 to the engineer, also at the will of the pilot.

The system further comprises a substantially closed fluid pressure control system embodying one or more fluid compressors 12 arranged to be driven in any suitable manner, as by the engines 1 and 2, to draw air from an intake pipe 13 and to compress such air and discharge same into a discharge pipe 14 leading to a main storage reservoir 15. Fluid compressed into reservoir 15 equalizes past a check valve device 16 into an auxiliary supply reservoir 17 and thence through a pipe 18 and past a check valve device 19, like check valve device 16, into an emergency supply reservoir 20.

From the auxiliary supply reservoir 17 fluid under pressure flows through a pipe 21 to a double check valve device 22 associated with the pilot's control valve device 11, and also to a double check valve device 23 associated with the fluid pressure control devices 7 and 8. Fluid under pressure from the emergency supply reservoir 20 is supplied through a pipe 24 to the double check valve device 22 and through a separate pipe 25 to the double check valve device 23.

The double check valve devices 22 and 23 may be identical to each other in structure, and each may comprise a valve piston 26 which in the two devices is subject on opposite ends to pressure of fluid supplied through pipes 21 and 24, and pipes 21 and 25, respectively. The valve piston 26 in each of the double check valve devices is biased to a normal position by a spring 27 for opening communication between pipe 21 and a supply passage 28 in the device and for closing communication between said passage and the other pipe connected to said device. A sudden drop in pressure in pipe 21, due to breakage thereof, and a corresponding drop in pressure on the connected end of valve piston 26 in the double check valve devices will permit pressure of fluid acting on the opposite end from either pipe 24 or 25 to move the valve piston from its normal position to an opposite position for closing communication between passage 28 and pipe 21 and for connecting said passage to pipe 24 or pipe 25. By this arrangement a supply of fluid is always assured to passage 28 in the double check valve devices from either the auxiliary supply reservoir 17 or the emergency supply reservoir 20.

The intake pipe 13 to compressor 12 is connected to what may be called a sump reservoir 29 which is provided to receive, through a pipe 30, fluid under pressure which has been used for controlling other devices on the airplane, which devices are not shown in the drawing. This reservoir is also connected with the atmosphere by a pipe containing a check valve 31 through which fluid may flow from the atmosphere to the reservoir for compression by the compressor 12 when the pressure in the reservoir is reduced to a degree below that of the atmosphere. The check valve 31 prevents the flow of fluid from the sump reservoir 29 to the atmosphere at a time when the pressure in said reservoir exceeds that of the atmosphere.

The sump reservoir 29 is connected by a pipe 32 to what may be called an auxiliary sump reservoir 33 which is connected to a return pipe 34 leading from the fluid pressure control devices 7 and 8 and from the pilot's control device 11. A check valve 35 in pipe 32 is provided to prevent flow of fluid under pressure from the sump reservoir 29 to the auxiliary sump reservoir 33 when the former contains fluid at a pressure which exceeds that in the latter, but to allow flow of fluid in the opposite direction when the pressure in the sump reservoir 29 is lower than that in the auxiliary sump reservoir 33 in order that the compressor 12 may withdraw fluid from the auxiliary sump reservoir through the sump reservoir and compress same into the storage reservoirs.

The auxiliary sump reservoir 33 is provided to receive fluid under pressure which has been used for operating the regulating device 5 and 6, in a manner which will be later described, under a condition where the sump reservoir 29 may be charged with used fluid from pipe 30 at a pressure which exceeds that in the auxiliary sump reservoir 33. The auxiliary sump reservoir is therefore preferably of a volume which will allow the pressure of operating fluid in the regulating devices 5 and 6 to reduce to at least a certain low pressure, such as 10 pounds in excess of that of the atmosphere.

In order to prevent the pressure of fluid in the auxiliary sump reservoir 33 ever exceeding this chosen low degree, a pressure release valve device 36 is associated with said reservoir. This release valve device comprises a check valve 37 contained in a chamber 38 which is open to the atmosphere through a passage 39 and which valve is arranged to control a fluid pressure release communication between the reservoir and the atmosphere by way of said chamber. A spring 40 in chamber 38 is cooperative with atmospheric pressure in said chamber acting on the check valve 37 for urging it to its closed position shown. This spring exerts a pressure on the check valve 37 which will allow opening thereof, in case the pressure of fluid in the reservoir tends to increase over 10 pounds above atmospheric pressure, to thereby relieve the excess fluid from the reservoir, and thus limit the pressure in said reservoir to the desired degree.

The auxiliary sump reservoir 33 and release valve device 36 associated therewith are only required to provide for a certain release operation of the regulating devices 5 and 6 at a time when the sump reservoir 29 is charged with fluid at a pressure in excess of that in the auxiliary sump reservoir, which operation will be later described in detail. At other times, the pressure in the auxiliary sump reservoir will never increase to the degree limited by the release valve device 36 due to operation of the compressor 12 to withdraw fluid under pressure therefrom.

The regulating devices 5 and 6 are identical with each other in construction. Each of the devices comprises a casing containing a flexible diaphragm 43 having at one side a fluid pressure control chamber 44 and having at the opposite side a chamber 45 containing a diaphragm follower 46 engaging the diaphragm and provided with a stem 47 extending through a suitable bore in the casing to the exterior thereof. Chamber 45 is in constant communication with the atmosphere, as by way of clearance space which may exist between the stem 47 and its bearing in the casing, and said chamber contains a spring 48 bearing against the follower 46 with such force as to move the diaphragm 43 to its normal position shown in the drawing against fluid in the control chamber 44 at the maximum pressure retained in the auxiliary sump reservoir 33 by the pressure release device 36.

In each of the regulating devices 5 and 6, stem 47 outside of the casing is pivotally connected to an operating lever 49 intermediate its ends. One end of this lever is connected by a pin 50 to one end of a link 51 the opposite end of which is pivotally connected to the casing by a pin 52. The opposite end of the lever 49 is operatively connected to lever 4 of the fuel supply governing means 3 on the respective engine.

With diaphragm 43 in each of the regulating devices 5 and 6 in its normal position shown in the drawing, the connected lever 49 is adapted to be positioned for positioning lever 4 of the respective fuel supply governing means in an idling position to provide for operation of the engine at idling speed. Upon supply of fluid under pressure to chamber 44 to a degree exceeding the opposing force of spring 48 and atmospheric pressure in chamber 45 the diaphragm 43 will deflect in a direction against said spring for rocking the lever 49 and thereby lever 4 to accelerate the respective engine to a degree corresponding to the pressure of fluid in chamber 44 in excess of said opposing pressure. Release of fluid under pressure from chamber 44 will allow movement of the lever 49 back to its normal position under the action of spring 48 to thereby actuate lever 4 to reduce the speed of the respective engine to idling, as will be apparent.

Pressure chamber 44 in the regulating device 5 is connected by a pipe 53 to the fluid pressure control device 7, while said chamber in the regulating device 6 is connected by a pipe 54 to the fluid pressure control device 8.

The fluid pressure control devices 7 and 8 are identical to each other in construction and comprise a common housing 57 having three passages 58, 59, and 60 connected to each of said devices. The passage 58 is connected to pipe 34 leading to the auxiliary sump reservoir 33, and passages 59 and 60 are connected by pipes 61 and 62, respectively, to the pilot's control device 11.

Each of the fluid pressure control devices 7 and 8 further comprises two coaxially arranged flexible diaphragms 63 and 64 which are spaced apart and clamped around their marginal edges in the casing. The diaphragm 63 is preferably of slightly smaller area than diaphragm 64, and the two diaphragms cooperate to form between them a chamber 65. At the opposite side of diaphragm 63 is a chamber 66 while at the opposite side of diaphragm 64 is a chamber 67, these two chambers being in permanent communication with each other through a passage 68.

A follower member 69 extending centrally through each diaphragm 64 is clamped to opposite sides thereof and is provided with a cylindrical guide portion 70 extending through chamber 67 and a bore in a wall 71 into a chamber 72, the chamber 72 being in constant communication with chamber 67 through a restricted port 73. Chambers 72 in the two fluid pressure control devices 7 and 8 are also connected respectively through cut off valve devices 171 and 172 to pipes 53 and 54 leading to the regulating devices 5 and 6.

Below chamber 72 in each of the control devices 7 and 8 the casing is provided with a chamber 74 which is constantly supplied with fluid under pressure from passage 28 in the double check valve device 23 by way of a check valve 75, this supply of fluid pressure to chamber 74 in the control device 8 being by way of chamber 74 in the control device 7 and a connecting passage 75a. A fluid pressure supply valve 76 contained in chamber 74 has a fluted stem 77 extending through a bore in the casing into chamber 72, said valve being arranged to control flow of fluid under pressure from chamber 74 to chamber 72. The end of fluted stem 77 is provided with a release valve 78 arranged to cooperate with a seat provided on the adjacent end of follower member 69. A bias spring 79 in chamber 74 acts on the supply valve 76 urging it to its seated position shown. A bias spring 80 in chamber 72 acts on the follower member 69 biasing same in a direction away from the release valve 78.

A follower member 81 extends centrally through each of the smaller diaphragms 63 and is clamped to opposite sides thereof. The follower member 81 has a stem 82 extending into chamber 65 wherein it has telescopic engagement in a bore 83 provided in an upwardly extending portion 84 of the follower member 69. The portion 84 is provided with an annular groove encircling the stem 82 and in which is disposed a ring seal 85 contacting the periphery of said stem for preventing leakage of fluid under pressure from chamber 65 to bore 83. The bore 83 is connected by passage 86 to the seat of the release valve 78, said valve controlling communication between said passage and chamber 72.

The diaphragm follower 81 is also provided with an upwardly extending stem 87 which extends through a chamber 88 in the casing to a point above the top wall of housing 57. At either side of chamber 88 the casing is provided with an annular groove encircling the stem 87 and in each of these grooves is a ring seal 89 encircling and engaging the periphery of said stem for preventing leakage of fluid under pressure along the stem. Chamber 88 is connected by a passage 91 extending through stems 87 and 82 to bore 83 in follower member 69, and also by a passage 90 to passage 58 which is connected to return pipe 34 leading to the auxiliary sump reservoir 33.

An engine cutout cock is associated with each of the fluid pressure control devices 7 and 8 and comprises a plug valve 93, and a lever 94 connected to said valve for turning same to either one of two different positions, namely, a pilot's control position in which the parts are shown in the drawing, and an engineer's control position in which the plug valve and lever will be located for instance 90° from the position shown in the drawing, or with the lever in a position such as indicated by a dot and dash line 95.

Each plug valve 93 is provided with a through passage 96 and with a notch 98 in one side thereof. In the pilot's control position of each valve 93 the passage 96 is arranged to connect passage 59 in the casing to a passage 97 leading to chamber 65 between the two diaphragms 63 and 64, while notch 98 is arranged to connect passage 60 in the casing to a passage 99, in the respective control device 7 or 8. When each plug valve 93 is in the engineer's control position the notch 98 will connect passages 99 and 97 in the respective control device 7 or 8 to passage 58 which is open to the auxiliary sump reservoir 33, while passage 96 in said valve will serve no function.

The two engineer's control devices 9 and 10 are identical to each other in construction and each comprises a cover member 101 secured to the casing 57 over stem 87 projecting from the diaphragm follower member 81 of the respective control device 7 or 8. Contained in each cover member 101 is a cam 102 having its peripheral surface aligned for contact with the end of the respective stem 87. This cam is carried by a shaft 103 to which is operatively connected an engineer's control lever 104, whereby movement of said lever will rock the cam 102 relative to the end of the stem 87.

Each lever 104 has a normal or engine idling position in which it is shown in the drawing and is operable upon movement therefrom in a clockwise direction as viewed in the drawing to cause acceleration of the respective engine in a manner which will be later described. When the engines are under control of the engineer each of the levers 104 is capable of individual adjustment to any position between the idling position and a position such as indicated by a dot and dash line 105 which provides for operation of the respective engine at maximum speed in a manner which will be later brought out. When, however, the speed of the engines is under the control of the pilot's control device 11, movement of the levers 104 from idling position is limited to a position such as indicated by a line 106.

For thus limiting movement of the levers 104 when the speed of the engines is under control of the pilot's control device 11, a piston 107 is associated with each of the engineer's control devices 9 and 10. This piston has at one side a pressure chamber 108 connected to passage 99, and has at the opposite side a chamber which is open to the atmosphere through the interior of the cover member 101 and which contains a spring 110 acting on the piston for urging same out of the position shown in the drawing. The piston 107 has a stem 111 projecting therefrom in alignment with the peripheral surface of cam 102. The cam is provided with a finger 112 arranged to engage the end of stem 111 when the lever 104 is in the position indicated by line 106 and when the piston 107 is in the position shown in the drawing. The piston is adapted to be moved to this position by fluid pressure supplied, in a manner to be later described, to chamber 108 and said position is defined by contact between an enlarged portion 113 of the piston stem 111 and the cover member 101. When chamber 108 is open to the sump reservoir 33 in a manner which will be later described, the piston 107 is operative by spring 110 to move stem 111 away from the cam finger 112 sufficiently to permit movement of the control lever 104 to the position indicated by line 105.

The peripheral surface of cam 102, arranged for contact with stem 87, is so designed as to effect a chosen degree of displacement of said stem in a direction away from the cam upon movement of the lever 104 from the idling position shown to the position indicated by line 105, and to provide only a relatively small portion of this displacement upon movement to the position indicated by line 106, this portion being for instance 10 percent of the maximum provided by movement of the lever to the position indicated by line 105.

The pilot's control device 11 comprises a casing containing a self-lapping fluid pressure supply and release valve mechanism 116 and a control transfer mechanism 117.

The mechanism 116 comprises two flexible diaphragms 118 and 119 preferably of substantially the same diameter, coaxially arranged, spaced apart and secured around the marginal edges in the casing. A diaphragm follower 120 extends centrally through both of these diaphragms and is clamped to opposite sides thereof. The two diaphragms cooperate to form a chamber 121 which is open through a passage 122 and a chamber 123 in the control transfer mechanism 117 to return pipe 34 leading to the auxiliary sump reservoir 33. At the opposite side of diaphragm 118 is a chamber 124 which is in constant communication with the atmosphere through a passage 125. At the opposite side of diaphragm 119 is a chamber 126 which is open through a cutoff valve device 127 to pipe 61 leading to the fluid pressure control devices 7 and 8.

Below chamber 126 is a chamber 128 which is constantly supplied with fluid under pressure from passage 28 in the double check valve device 22 by way of a passage 129, a chamber 130 and past a check valve 131 contained in chamber 128. Chamber 128 also contains a fluid pressure supply valve 132 having a fluted stem 133 extending through a bore in the casing into chamber 126. On the end of stem 133 in chamber 126 is a fluid pressure release valve 134 arranged to cooperate with a seat provided on the adjacent end of follower 120 for controlling communication between said chamber and a release passage 135 extending through said follower and opening to chamber 121 between the two diaphragms. A spring 136 in chamber 128 acts in opposite directions on the check valve 131 and supply valve 132 urging same to their closed positions shown.

Above the diaphragm 118 the casing has a bore open to chamber 124 in coaxial relation with said diaphragm and containing a plunger 137 between which and the adjacent end of follower 120 is interposed a spring 138. The plunger 137 has an operating stem 139 projecting through a suitable bore in the casing into a chamber 140 and within this bore the stem 139 may be encircled by a ring seal 141 carried in the casing for preventing leakage of fluid under pressure between chamber 140 and chamber 124 under a condition which will be later described where pressure of fluid in chamber 140 would exceed that in chamber 124. Otherwise the ring seal 141 might be dispensed with.

The end of the plunger stem 139 is arranged to contact the peripheral surface of a cam 142 which is secured to turn with a shaft 143 journaled at its opposite ends in the casing. An operating lever 144 has one end secured to shaft 143 for turning same, and said lever extends through a suitable slot 145 to the exterior of the casing.

The lever 144 which is provided for controlling the speed of the engines 1 and 2 through the medium of the self-lapping mechanism 116 has an engine "Idling" position in which it is shown in the drawing, and is movable from this idling position through a speed control zone to a position indicated by a dot and dash line bearing the legend "Full speed." The cam 142 is so designed as to effect gradual displacement of the stem 139 in a downwardly direction upon movement of the lever in the direction from "Idling" position toward "Full speed" position and to allow reverse movement of the stem 139 by spring 138 upon movement of lever 144 in the direction of "Idling" position, for thereby positioning said stem downwardly from the position shown in the drawing an extent proportional to the distance the lever is away from the "Idling" position.

The control transfer mechanism 117 comprises a fluid pressure supply valve 147 contained in a chamber 148 constantly supplied with fluid under pressure by way of chamber 130. This valve has a fluted stem 149 extending into a chamber 150 which is normally open through a passage 163 and a cutoff valve device 164 to pipe 62 leading to the fluid pressure control devices 7 and 8. The chamber 150 is provided at one side of a sliding plunger 151 which at its opposite side is open to chamber 123. The valve 147 is provided for controlling supply of fluid under pressure from chamber 148 to chamber 150 and thence to pipe 62 and is subject in chamber 148 to the pressure of a spring 152 urging the valve to its closed position. The plunger 151 has an axial bore in which is slidably mounted a stem of a fluid pressure release valve 153 which valve is contained in chamber 123 and cooperates with plunger 151 for controlling communication between said chamber and chamber 150. The diameter of fluted stem 149 is larger than that of the axial bore in plunger 151 so as to be engaged by said plunger upon downward movement thereof. A spring 154 contained in chamber 150 bares on the plunger 151 biasing same in a direction away from the supply valve 147. The casing is provided with an annular groove encircling plunger 151 and containing a ring seal 155 having sealing contact with the periphery of said plunger for preventing leakage of fluid pressure from chamber 150 to chamber 123.

An operating pin 156, slidably mounted in a bore in the casing, extends into chambers 123 and 140. One end of this pin is arranged to engage the release valve while its opposite end is arranged for contact with the peripheral surface of an operating cam 157 mounted on shaft 143 and secured to turn therewith. The casing is provided with an annular groove encircling the pin 156 and containing a ring seal 158 having sealing contact with the peripheral surface of said stem for preventing leakage of fluid under pressure from 123 to chamber 140 which is open to the atmosphere through slot 145 in which lever 144 operates. The cam 157 has a surface 159 arranged to hold stem 156 in the position shown in Fig. 1 when the pilot's control lever 144 is in "Idling" position and in all positions therebetween and "Full speed" position. In this position of pin 156, said pin holds the release valve 153 seated against plunger 151 and through said valve holds said plunger displaced against spring 150 to a position for holding the supply valve 147 unseated through the medium of the supply valve stem 149, as shown in the drawing. The cam surface 159 is joined by a step 160 to a surface 161 which, when aligned with the pin 156, as obtained by movement of the pilot's control lever 144 from "Idling" position to a position indicated by a dot and dash line bearing the legend "Change," allows upward movement of pin 156 to a position for permitting spring 154 to move plunger 151 into contact with a stop shoulder 162 and then unseating of the release valve 153 from said plunger. Under this condition spring 152 will seat the supply valve 147 for cutting off flow of fluid from chamber 148 to chamber 150, and pressure of fluid in the latter chamber will then unseat the release valve 153 for releasing fluid pressure from chamber 150 to chamber 123 and thence through the pipe 34 to the auxiliary sump reservoir 33.

The cutoff valve devices 171 and 172 normally provide open communications between chambers 72 in the fluid pressure control devices 7 and 8 and pipes 53 and 54 respectively, while the cutoff valve devices 127 and 164 normally provide open communication between chambers 126 and 150 in the pilot's control device 11 and pipes 61 and 62, respectively. These cutoff valve devices are provided for closing the communications controlled thereby in case of rupture or breakage of the respective pipe to which they are connected as to prevent loss of fluid under pressure from the system and to also prevent the rupture of one pipe interfering with operation of other parts of the system.

The cutoff valve device 171, 172, 127 and 164 are all identical to each other in construction, each comprising a casing containing a valve piston 165 arranged to control communication between a passage 166 therein and the respective pipe. In the cutoff valve devices 171 and 172 the passage 166 is connected to chamber 72 in the fluid pressure control devices 7 and 8, while in the cutoff valve devices 127 and 164 said passage is connected to chambers 126 and 150; respectively.

In each cutoff valve device a spring 167 acting on the side of the valve piston 165 which is open to the respective pipe biases said piston to its communication opening position shown in the drawing. At the opposite side of the valve piston is a chamber 168 open to a volume 169 and also open through a restricted passage 170 to passage 166.

When fluid under pressure is supplied through each cutoff valve device to the respective pipe by way of passage 166, fluid under pressure also flows from said passage into chamber 168 and volume 169 through the restricted passage 170 which retards the increase in pressure in said chamber and volume on one end of the valve piston to insure that the valve piston will be held in the communication opening position shown by spring 167 and the increase in pressure of fluid on the opposite end of the valve piston. In case of breakage of the pipe connected to any one of the cutoff valve devices resulting in a sudden reduction in pressure of fluid on the spring engaged end of the respective valve piston 165, the passage 170 retards the outflow of fluid under pressure from chamber 168 and volume 169 to such a degree as to provide a sufficient differential between the opposing fluid pressures acting on the valve piston as to shift said valve piston to a position for closing communication between passage 166 and the respective pipe so as to thereby prevent loss of fluid under pressure through the ruptured pipe to the atmosphere. Upon subsequent repair or replacement of the ruptured pipe, the valve piston 165 in the cutoff valve device may be caused to return to its communication opening position shown in the drawing by spring 167 by operation of the respective control devices to release fluid under pressure from chamber 168 in a manner which will be apparent from the description to follow.

*Operation*

In operation let it be assumed that the pilot's control lever 144 is in idling position shown in the drawing which effects seating of the release valve 153 and unseating of the supply valve 147. Fluid under pressure then flows past the supply valve 147 to chamber 150 and thence through passage 166 in the cutoff valve device 164 and pipe 62 to passage 60 in the fluid pressure control valve devices 7 and 8. Fluid under pressure thus supplied to passage 60 in the fluid pressure control devices 7 and 8 flows through notches 98 in the plug valves 93 to passages 99 and thence to chambers 108 wherein it acts on pistons 107 to move same to the positions shown in the Fig. 1, to thereby limit movement of the engineer's control levers 104 to the positions indicated by the dash and dot lines 106.

With the pilot's control lever 144 in its idling position as shown, the pressure of spring 138 on diaphragm follower 120 is relieved to allow movement of the two diaphragms 118 and 119 to the positions shown for positioning the follower 120 out of contact with the release valve 134. Under this condition spring 136 will seat the supply valve 132, and chamber 126 below diaphragm 119 will be open past the release valve 134 and through passage 135 in the diaphragm follower 120 to chamber 121 and thence through pipe 34 to the auxiliary sump reservoir 33. With chamber 126 open to the auxiliary sump reservoir, chamber 65 between the two diaphragms 63 and 64 in both of the fluid pressure control devices 7 and 8 will be open to the auxiliary sump reservoir by way of passages 97, ports 96 in the plug valves 93, passage 59 and pipe 61.

With chambers 65 between diaphragms 63 and 64 open to the auxiliary sump reservoir and with the engineer's control levers 104 in the positions shown in Fig. 1 allowing expansion of springs 91 and thus relief of the force of said springs on diaphragms 64, the bias springs 80 acting on the diaphragm follower members 69 will move said members to the positions shown in Fig. 1 out of sealing engagement with the release valves 78. Under this condition the supply valves 76 will be closed by springs 79, and chambers 67 below diaphragms 64 and the connected chambers 72 will be open to the auxiliary sump reservoir past said release valves and thence through passages 86, bores 83, passages 91, chambers 88, passages 90, and 58 and pipe 34. Since chambers 72 in the fluid pressure control devices 7 and 8 are open to diaphragm chambers 44 in the regulating device 5 or 6, respectively, the latter chambers will also be open to the auxiliary sump reservoir with chambers 72 and thus allow springs 48 in the regulating devices to move the diaphragm 43 and diaphragm followers 46 therein to their normal position shown in the drawing. In this position of the diaphragms 43 the operating levers 49 will be moved to their engine idling positions for correspondingly positioning levers 4 of the fuel governing devices 3, whereby both of the engines 1 and 2 will be caused to operate at idling speed.

Now let it be assumed that the pilot desires to simultaneously increase the speed of both engines 1 and 2 to a degree above idling speed. To accomplish this he moves the lever 144 out of "Idling" position in the direction of "Full speed" position and this movement turns the cam 142 which urges the plunger 137 against spring 138 to thereby increase the pressure of said spring on the diaphragm follower 120 to a degree depending upon the extent of movement of said lever from the "Idling" position. This increase in pressure of spring 138 on the diaphragm follower 120 moves said follower in a downwardly direction into contact with the release valve 134 and then it acts through said valve to open the supply valve 132. Fluid under pressure then flows past the supply valve 132 to chamber 126 and thence through the cutoff valve device 127 and pipe 61 to passage 59 in the housing 57 of the fluid pressure control devices 7 and 8 from said passage to chamber 65 between the two diaphragms 63 and 64 in each of said control valve devices.

In each of the control valve devices 7 and 8, fluid under pressure thus obtained in chamber 65 deflects the diaphragm 64 in a downwardly direction which causes movement of the follower member 69 first into engagement with the release valve 78 and then such deflection acts through said valve to unseat the supply valve 76 whereupon fluid under pressure flows past said supply valve to chamber 72 and thence through the cutoff valve device 171 or 172 and pipe 53 or 54 to chamber 44 in the regulating device 5 or 6, it being noted that all of the fluid pressure control devices 7 and 8 operate in response to movement of the pilot control lever 144, to simultaneously supply fluid under pressure to the respective regulating devices at all of the engines.

Fluid under pressure supplied to chamber 72 in each of the fluid pressure control devices flows through choke 73 to chamber 67 below the diaphragm 64 and when the pressure of fluid thus obtained in chamber 67 increases to a sufficient degree with respect to the opposing pressure of fluid in chamber 65, this pressure in chamber 67 aided by bias spring 80 moves the diaphragm follower 69 in an upwardly direction to permit closing of the supply valve 76 by spring 69 to thereby limit the pressure of fluid obtained in chamber 72 and in chamber 44 of the respective regulating device in accordance with the pressure of fluid provided in chamber 65 by the pilot's control valve device 11.

In each of the regulating devices 5 and 6 the pressure of fluid obtained in chamber 44 and acting on diaphragm 43 deflects same in the direction of the left hand against the opposing force of spring 48 and to a position in which such force balances the pressure of said fluid, and this movement rocks the lever 49 and thereby the lever 4 of the fuel control device 3 to a position for causing acceleration of the respective engine to a degree determined by the pressure of fluid supplied to chamber 44.

Since the pressure of fluid supplied to pipe 61 is governed by the degree of compression of the spring 138 in the pilot's control valve device 11 which in turn is varied according the extent of movement of pilot's control lever 144 from "Idling" position, and further, since the fluid pressure control valve devices 7 and 8 operate to supply fluid at a corresponding pressure to the speed regulating devices 5 and 6, respectively, it will be seen that the degree of acceleration of the engines will correspond to the position of the pilot's control lever 144 out of "Idling" position.

If the pilot desires to cause further acceleration of the engines he moves the control lever 144 further in the direction of "Full speed" position to thereby increase the pressure of fluid in the pipe 61 for actuating the diaphragms 64 in the fluid pressure control devices 7 and 8 to cause a corresponding increase in pressure in diaphragm chamber 44 of the respective regulating devices 5 and 6. To obtain maximum engine speed the pilot moves the lever 144 to "Full speed" position in which a maximum pressure of fluid is provided in pipe 61 to cause operation of the fluid pressure control devices 7 and 8 to provide a corresponding maximum degree of pressure in diaphragm chambers 44 of the regulating devices 5 and 6.

If the pilot desires to reduce the speed of engines 1 and 2 he moves the lever 144 back toward "Idling" position. This movement allows expansion of spring 138 and thereby a reduction in its force on diaphragm follower 120, which permits pressure of fluid in chamber 126 to deflect the diaphragms 119 and 118 in an upwardly direction for pulling the follower 125 away from the release valve 134. Fluid under pressure is then released from chamber 126 below diaphragm 119, and thus from pipe 61 and chambers 65 in the fluid pressure control devices 7 and 8, and when such pressure is reduced to a degree substantially corresponding to the reduction in force of spring 138, said spring will move the follower 120 back into seating contact with the release valve 134 to thereby limit the reduction in pressure in chamber 126 and in chambers 65 of the fluid pressure control devices in accordance with the new position of the pilot's control lever 144.

This reduction in pressure in diaphragm chambers 65 of the fluid pressure control devices 7 and 8 permits the opposing pressure of fluid in chambers 67 to deflect the diaphragms 64 in an upwardly direction to pull the follower members 69 out of seating engagement with the release valves 78. With the valves 78 thus opened, fluid under pressure flows from diaphragm chambers 44 in the regulating devices 5 and 6 past said valves 78 to bores 83 and thence to the auxiliary sump reservoir. When the pressure of fluid in chambers 67 and 44 is thus reduced to a degree corresponding to the reduction in pressure in chambers 65, the diaphragms 64 deflect downwardly into seating engagement with the release valves 78 to thereby limit the pressure of fluid in chambers 44 of the regulating devices 5 and 6 in accordance with the new position of the pilot's control lever 144.

If the pilot's control lever is returned further toward "Idling" position a further reduction in pressure of fluid in diaphragm chambers 44 in the regulating devices 5 and 6 will occur corresponding to the new position of said lever. If the lever 144 is returned to "Idling" position in which the diaphragm follower 125 is allowed to remain out of seating engagement with the release valve 134, equalization of the pressure of fluid in diaphragm chambers 44 in the regulating devices 5 and 6 into the auxiliary sump reservoir 33 will occur.

As the pressure of fluid in diaphragm chambers 44 in the regulating devices 5 and 6 is reduced, springs 48 therein correspondingly position the levers 49 and thereby the levers 4 of the fuel supply devices 2 and 3 to correspondingly reduce the speed of the engine, while upon return of the pilot's control lever to idling position the regulating devices will operate to return the levers 4 of the fuel control devices to their idling position, as will be apparent.

It will thus be seen that with lever 144 of the pilot's control device 11 in "Idling" position the regulating devices 5 and 6 will operate to correspondingly position levers 4 of the fuel control devices 3, while upon movement of said lever to any position up to and including "Full speed" position, the levers 4 at all of the engines will be correspondingly positioned simultaneously to obtain corresponding speed of the engines.

When the pilot is controlling the speed of the engines, the engineer may, through the medium of suitable gages, note that the speed of one engine is lower than that of another engine and therefore desire to increase the speed of the slower engine in order to bring both into synchronism. Let it be assumed that the speed of engine 1 is the lower. Under this condition the engineer will move lever 104 of the control device 9 out of the position shown in Fig. 1 in the direction of the position indicated by the dot and dash line 106. This movement will turn cam 102 in the control device 9 and cause downward movement of stem 87 to compress spring 91 in the fluid pressure control device 7, so that said spring will exert a force on the respective diaphragm 64 in cooperation with the pressure of fluid in chamber 65, and which force will depend upon the extent of movement of lever 104. This increase in force on the diaphragm 64 in the fluid pressure control device 7 will then cause operation thereof to cause a corresponding increase in pressure of fluid in chamber 44 of the regulating device 5, and in turn, a corresponding change in position of levers 49 and 4 and acceleration of the engine 1 relative to the speed of engine 2. By proper positioning of the lever 104 in the control device 10 away from the position in which it is shown in the drawing, it will therefore be seen that the speed of engine 1 can be brought into synchronism with that of engine 2. In case the speed of engine 2 should be lower than that of engine 1, it may be increased to that of engine 1 by operation of lever 104 of the engineer's control device 10, in a like manner.

Only a relatively small change in speed of one engine with respect to that of the other, when all engines are under the control of the pilot will be required to bring the speed of both engines into synchronism. To obtain this small change in speed may require movement of the respective engineer's control lever 104 to any position up to and including the position indicated by the dot and dash line 106. Movement of the lever past this position when the pilot is controlling the engines is prevented by stem 111 projecting from piston 110, the purpose of which is to prevent the engineer interfering with the pilot's control of the engines, beyond the minor adjustments for the purpose of synchronizing the speed of one engine with respect to the speed of another.

While the engines are under control of the pilot, if for any reason it should become desirable to stop any one or more of the engines or take the control thereof from the pilot, the engineer may accomplish this by turning the proper lever or levers 94 and plug valve or valves 93 from the pilot's control position shown in Fig. 1 to the engineer's control position in which the lever or levers will occupy the position indicated by the dash and dot line 95. With the plug valve 93 in the engineer's control position, the notch 98 and passage 96 therein are moved out of registry with passages 59 and 60, and passages 97 and 99 are both opened through notch 98 to passage 58 and thence to the auxiliary sump reservoir 33 through pipe 34. Chamber 65 in the respective fluid pressure control device 7 or 8 being thus opened to the sump reservoir permits pressure of fluid in chamber 67 to deflect the diaphragm 64 upwardly for thereby unseating the diaphragm follower 69 from the release valve 68. With the respective engineer's control lever 104 in the position shown in the drawing fluid under pressure is then released from chamber 72 and diaphragm chamber 44 in the respective regulating device 5 or 6 to the sump reservoir to equalization therein so that spring 48 in the regulating device may return the lever 49 thereof and thereby lever 4 of the respective fuel control device 3 to its engine idling position for thereby reducing the speed of the respective engine to idling. This engine may then be stopped if desired.

If the engine is then repaired or otherwise placed in condition for operation, again the engineer may transfer the control of the engine back to the pilot by turning handle 94 of the respective plug valve 93 back to the pilot's control position shown in the drawing for thereby reconnecting chamber 65 in the respective fluid pressure control device 7 or 8 to the pilot's speed control pipe 61 and for again opening chamber 108 to the change pipe 62 leading to the pilot's control device 11.

Whenever the pilot desires that the engineer take over the control of speed of the engines, he moves lever 144 from the "Idling" position to the "Change" position to thereby effect operation of the transfer mechanism 117 to release fluid under pressure from pipe 62 and thereby from piston chambers 108 in the engineer's control devices 9 and 10 to the auxiliary sump reservoir 33. With the pilot's control lever 144 in the "Change"

position the pressure of spring 138 on the diaphragm follower 120 is completely relieved so that pipe 61 and thereby diaphragm chambers 65 in the fluid pressure control devices 7 and 8 will be open to chamber 121 and thereby to the auxiliary sump reservoir 33. Under this condition the engineer may individually control the speed of each engine, as will now be described.

Let it be assumed that the engineer desires to increase the speed of engine 1. To accomplish this he moves lever 104 in the control device 9 in a clockwise direction as viewed in Fig. 1 for thereby moving stem 87 in the fluid pressure control device 7 in a downwardly direction to compress spring 91. At this time chamber 65 in the fluid pressure control device 7 is open to the auxiliary sump reservoir 33 through the pilot's control device 11, but the pressure of spring 91 on the diaphragm follower 69 moves said follower in a downwardly direction to close the release valve 78 and open the supply valve 76 to thereby allow flow of fluid under pressure to chambers 67 and 72 and thence to the regulating device 5. This flow continues until the pressure of fluid obtained in chamber 67 and thus in chamber 44 in the regulating device 5 is increased to a degree which overcomes the opposing force of spring 91 in diaphragm 64 and then actuates said diaphragm to move follower 69 upwardly to a position to allow closing of the supply valve 76. Fluid is thus supplied to chamber 44 in the regulating device 5 at a pressure corresponding to the force of spring 91 in the fluid pressure control device 7, which in turn is determined by the position of lever 104 in the engineer's control device 9 out of its normal position shown in the drawing. The regulating device 5 then operates in accordance with the pressure of fluid in chamber 44 to position levers 49 and 4 for causing operation of engine 1 at a corresponding speed. To increase the speed of the engine 1 the engineer may move the lever 104 in the control device 9 further in a clockwise direction, and the maximum speed will be obtained in a position of said lever indicated by the dash and dot line 105, it being noted that movement of the lever 104 to this latter position is permitted when the speed of the engine is under the control of the engineer since stem 111 of the respective piston 107 is moved inwardly from the position shown by spring 110 on account of chamber 108 at the opposite side of piston 107 being at this time open to the auxiliary sump reservoir.

If the engineer desires to reduce the speed of engine 1 he moves lever 104 in the control device 9 in a counter-clockwise direction to thereby allow stem 87 in the fluid pressure control device 7 to be moved upwardly by the force of spring 91 with a corresponding reduction in the degree of such force on diaphragm 64. This reduction in the force of spring 91 on the diaphragm 64 then allows pressure of fluid in chamber 67 to deflect said diaphragm in an upwardly direction away from the release valve 78 whereupon fluid under pressure is released from chamber 72 and diaphragm chamber 44 of the regulating device 5 to the auxiliary sump reservoir. When the pressure of fluid in chambers 67 and 72 in the fluid pressure control device 7 is thus reduced to a degree where the opposing force of spring 91 predominates, said spring moves the diaphragm follower 69 back into engagement with the release valve 78 to thereby limit the reduction in pressure in chamber 72 and in chamber 44 of the regulating device 5 in accordance with the reduction in force of spring 91, as determined by the position of lever 104. The regulating device 5 will then operate to cause a corresponding reduction in speed of the engine.

It will now be seen that the engineer may cause engine 1 to operate at any desired speed by proper positioning of lever 104 in the control device 10. The engineer may also independently operate lever 104 of the engineer's control device 11 for causing operation of the engine 2 at any desired speed, it being noted that the speed of both engines may be individually controlled by the engineer and it will be further noted that under such control there is no fine vernier adjustment of the speed of the engines, as when the speed is under the control of the pilot's control device 11 since such fine adjustment of engine speed is not considered necessary during control by the engineer.

In each of the control valve devices 7 and 8 chamber 66 above diaphragm 63 is open by way of passage 68 to chamber 67 below the diaphragm 64 so that the same fluid pressure will always be effective in both of said chambers in order that the force of spring 91 as determined by the position of the respective lever 104 may be substantially counterbalanced by fluid pressure in chamber 66 and thus rendered substantially ineffective on stem 87 to oppose movement of cam 102 by the engineer's control lever 104. Thus the engineer may with substantially the same degree of ease move the lever 104 to any selected position outside of its normal position shown in the drawing, either when the engine speed is under his control at which time the chamber 65 between the diaphragms is open to the auxiliary sump reservoir 33, or when the main control of engine speed is under control of the pilot and vernier adjustment thereof is under the control of the engineer.

The diaphragm 63 is slightly smaller in area than diaphragm 64, as above mentioned, so that pressure of fluid in chamber 67 effective on the larger diaphragm 64 will create an upwardly acting force slightly greater than the opposing force developed by fluid pressure in chamber 66 on diaphragm 63 to thereby provide a bias force in addition to that of spring 80 urging the stem 87 against cam 102 and in the direction for effecting a release of fluid under pressure from chamber 67, to thus insure against undesired opening of the supply valve 76 by pressure of fluid obtained in chamber 66.

In order to reduce the speed of engines 1 and 2, or to obtain operation of said engines at idling speed, fluid is released from diaphragm chambers 44 in the regulating devices 5 and 6 to the auxiliary sump reservoir 33, as before described. At the time fluid is thus released from chambers 44 the auxiliary sump reservoir 33 may be charged with fluid at any degree of pressure from that of the atmosphere up to and including a pressure such as ten pounds in excess of atmospheric pressure, as limited by pressure limiting device 36, as above described, but movement of the parts of the regulating devices to the positions shown in the drawings against this pressure in the auxiliary sump reservoir is insured by springs 48, regardless of the pressure of the atmosphere which is effective in chambers 45.

Variations in pressure of fluid in the auxiliary sump reservoir 33 is effective in chamber 121 between the two diaphragms 118 and 119 in the pilot's control valve device 11, but its effect on one of said diaphragms is offset by the effect on the other, so as to thereby have no influence upon the pressure of fluid supplied by said device for controlling operation of the fluid pressure control devices 7 and 8. The pressure of fluid supplied by the pilot's control valve device 11 in any position of the operating lever 144 is governed by pressure of spring 138 and pressure of fluid in chamber 124. The pressure of fluid in chamber 124 is intended to be that of the atmosphere the same as exists in chamber 45 of the regulating devices 5 and 6 so that regardless of the altitude at which an airplane is operating, and consequently regardless of different atmospheric pressures, the same operation of the regulating devices 5 and 6 will be obtained for different positions of the pilot's control lever 144. This control apparatus may be applied to an airplane intended to operate at a very high altitude, in which case, the pilot's control station may be placed under pressure exceeding that of the atmosphere. In such a case passage 125 open to chamber 124 will be connected by a pipe (not shown) to the exterior of the pilot's control station and thus to the atmosphere so as to obtain the above results.

In the fluid pressure control devices 7 and 8 the pressure of fluid in the auxiliary sump reservoir 33 is only effective in chamber 88 around stem 87 and in bore 83 wherein it acts in one direction on one end of stem 82 and in the opposite direction on the relatively small seated area of the release valve 79 and thus variations in such pressure will have substantially no effect upon the pressure of fluid provided by said valve devices for controlling operation of the regulating devices 5 and 6 in response to operation of either the pilot's control valve device 11 or the engineer's control valve devices 9 and 10.

*Description Figure 4*

If desired, pipe 62 may be eliminated from the structure shown in Fig. 1 and above described by modifying each of the fluid pressure control devices 7 and 8 and engineer's control devices 9 and 10 in a manner shown in Fig. 4, and with such modification, the control mechanism 117 and the "Change" position in the pilot's control device 11 may be dispensed with.

According to this modification passage 60 in housing 57 is omitted. A piston 173 is employed in each of the engineer's control devices 9 and 10 which piston is of larger area than but functionally the same as piston 107 in the structure shown in Fig. 1. This piston is open at one side to a pressure chamber 174 which is connected by a passage 175 to passage 97. By this structure the piston 173 is subjected to pressure of fluid supplied by the pilot's control device 11 through pipe 61 for controlling operation of the fluid pressure control devices 7 and 8.

With this structure when the pilot's control lever 144 is in "Idling" position, piston chamber 174 in the control devices 7 and 8 will be opened to the auxiliary sump reservoir 33 by way of pipe 62 and a spring 176 acting on the opposite side of each piston 173 will move the piston 173 and the stem 111 to the position providing for the engineer's control levers 104 being moved through their full zone of travel from the position shown in the drawings to the position indicated by dot and dash line 105. In other words, the pilot can allow the engineer to control the engines 1 and 2 by placing his control lever 144 in "Idling" position. When the pilot moves lever 144 out of "Idling" position for controlling the engines, the pressure of fluid supplied through pipe 61 to chambers 65 in the fluid pressure control devices 7 and 8 to control said devices also is effective on the pistons 173 in the engineer's control devices 9 and 10 to move the stems 111 to the position shown in the drawing, so that with the pilot controlling the engines, the control by the engineer will be limited in the same manner and for the same reason as in the structure shown in Fig. 1.

The pistons 173 in this modification are of greater area than the corresponding pistons in the structure shown in Fig. 1 which are operated by fluid at the pressure in the supply reservoirs, due to need for operating same by a relatively lower pressure such as provided in response to a slight initial movement of the pilot's lever 144 out of "Idling" position.

In this modified structure the same plug valve 93 may be used for cutting an engine out of control by the pilot as employed in the structure shown in Fig. 1, the notch 98 in the plug valve in the modified structure providing however for the release of fluid under pressure from the respective piston chamber 174 along with that from diaphragm chamber 65 when the plug valve is in the engineer's control position.

*Summary*

From the above description, it will now be seen that we have provided a control arrangement for a plurality of internal combustion engines whereby an operator such as a pilot at one station may control the speed of all engines simultaneously as a unit, and whereby another operator, such as an engineer at another station, may control the speed of the engines individually. The control station is selected by the pilot whereby the pilot may at will, take over control of the engines and whereby he may, at will, transfer such control to the engineer. When the pilot is controlling the speed of the engines the engineer may provide slight adjustments in speed of one or more engines relative to another in order to bring the speed of the engines into synchronism. Such adjustments in speed on the part of the engineer are however of a minor character so that the main control of engine speed remains in the hands of the pilot.

The speed regulating devices are of a type having only one fluid pressure control chamber and when the main control of the engines is under the control of the pilot, the control of engine speed by both the pilot and the engineer is through the variation in the pressure of fluid in this one chamber. While the engines are under control of the pilot, the engineer may if necessary cutout any one or more of the engines and subsequently return that engine or engines to control by the pilot.

The system is substantially closed with respect to fluid pressure, that is, it provides for the reuse of fluid under pressure by the provision of a reservoir connected to the intake of the fluid compressing means for receiving all fluid under pressure used for controlling operation of the regulating devices. Such a system necessitates a certain back pressure in the system, but the various parts of the apparatus are so designed and arranged as to accomplish the desired end regardless of the degree of such back pressure and regardless of atmospheric pressure which may vary under different conditions of operation.

Having now described our invention, what we claim as new and desire to secure by Letters Patent, is:

1. In combination, a fluid pressure adjustable regulating device, a self-lapping valve device comprising a spring and a movable abutment operable in accordance with the degree of pressure of either or both said spring and/or of fluid on one side to supply fluid to adjust said regulating device in accordance with the degree of such pressure, one manually operative control device operable to vary the pressure of fluid on said one side of said movable abutment, another manually operative control device operative to vary the pressure of said spring, and mechanism operable upon operation of said one manually operative control device to provide fluid under pressure on said abutment, to limit compression of said spring by the other manually operative control device.

2. In combination, a movable abutment subject to opposing pressures of fluid in two chambers, a valve device operable by said abutment upon variations in pressure of fluid in one of said chambers to correspondingly vary the pressure of fluid in the other of said chambers, a control device operative to vary the pressure of fluid in said one chamber, a spring, a movable member operable to effect operation of said valve device to supply fluid to said other chamber and cooperative with said spring to limit the pressure of fluid thus supplied in accordance with the extent of movement of said movable member from a normal position, and mechanism operable, in response to operation of said control device to provide fluid under pressure in said one chamber to limit the extent of movement of said movable member out of said normal position to less than its full movement.

3. In combination, a regulating device adjustable in accordance with the difference between pressure of fluid in a regulating chamber and atmospheric pressure, a reservoir for receiving used fluid under pressure, a control valve device comprising a movable abutment subject to pressure of fluid in said regulating chamber and an opposing pressure in a control chamber and operative upon an increase in said opposing pressure to provide a corresponding pressure of fluid in said regulating chamber and upon a reduction in said opposing pressure to release fluid under pressure from said regulating chamber to correspondingly reduce the pressure of fluid therein, said control valve device comprising structure for conducting fluid released from said regulating chamber to said receiver so arranged as to render the pressure in said receiver ineffective to influence the pressure of fluid in said regulating chamber as governed by pressure in said control chamber, and self-lapping valve mechanism arranged to supply fluid under pressure to said control chamber and to release fluid under pressure from said control chamber to said receiver to thereby vary the said opposing pressure on said movable abutment, said self-lapping valve mechanism including structure subject to pressure of fluid in said receiver for conducting fluid from said control chamber to said receiver and so arranged as to render pressure of fluid in said receiver substantially ineffective in said self-lapping valve mechanism to influence pressure of fluid supplied to said control chamber by said self-lapping valve mechanism.

4. In combination, a regulating device comprising a casing having a chamber open to atmosphere, a control spring in said chamber, and a pressure sensitive member in said casing subject to pressure of fluid in a control chamber in said casing and to opposing pressure of said spring and atmosphere in the first named chamber, a fluid pressure control device comprising pressure sensitive means subject to pressure of fluid in said control chamber and an opposing force, and supply and release valve means operable by said pressure sensitive means to vary the pressure of fluid in said control chamber in proportion to said opposing force, one manually operable control device operative to vary said opposing force, and a second manually operable control device also operable to vary said opposing force.

5. In combination, a regulating device comprising a casing having a chamber open to atmosphere, a control spring in said chamber, and a pressure sensitive member in said casing subject to pressure of fluid in a control chamber in said casing and to opposing pressure of said spring and atmosphere in the first named chamber, a fluid pressure control device comprising pressure sensitive means subject to pressure of fluid in said control chamber and an opposing pressure, and supply and release valve means operable by said pressure sensitive means to vary the pressure of fluid in said control chamber in proportion to said opposing pressure, two control devices each comprising a manually operable lever having a zone of movement and means operable by said lever upon movement from a normal position at one end of said zone to increase said opposing pressure in proportion to the degree of such movement, movement limiting means arranged to limit manual movement of one of said levers from the respective normal position to a degree less than its full zone of movement, and means operable upon movement of the other lever out of its normal position to render said limiting means effective.

6. In combination, a regulating device comprising a casing having a chamber open to atmosphere, a control spring in said chamber, and a pressure sensitive member in said casing subject to pressure of fluid in a control chamber in said casing and to opposing pressure of said spring and atmosphere in the first named chamber, a fluid pressure control device comprising pressure sensitive means subject to pressure of fluid in said control chamber and an opposing pressure, and supply and release valve means operable by said pressure sensitive means to vary the pressure of fluid in said control chamber in proportion to said opposing pressure, two control devices each comprising a manually operable lever having a zone of movement and means operable by said lever upon movement from a normal position at one end of said zone to increase said opposing pressure in proportion to the degree of such movement, one of said levers being movable from its normal position out of its zone to a second position, movement limiting means arranged to limit manual movement of the other lever out of its normal position to a degree less than its full zone of movement, and control means controlled by said one lever operable to control said limiting means, said control means being operable upon movement of said one lever to said second position to render said limiting means ineffective and upon movement of said one lever out of said second position to render said limiting means effective.

7. In combination, a fluid pressure adjustable regulating device, a first control device comprising a manually operable lever having a certain zone of movement and means operable upon movement of said lever from one end of said zone to provide fluid in said regulating device at a pressure in proportion to the degree of such movement, a second control device comprising a manually operable lever having a certain zone of movement and means operable upon movement of its lever from one end of its zone of movement to also provide fluid in said regulating device at a pressure proportional to the degree of such movement, movement limiting means operable by fluid under pressure to limit manual movement of said lever of said first control device from the one end of its zone of movement to a degree less than its full zone of movement and being rendered ineffective upon the release of such fluid under pressure, and means controlled by said lever of said second control device operable to supply fluid under pressure to and release fluid under pressure from said movement limiting means.

8. In combination, a valve device comprising valve means and a movable abutment operable by pressure to actuate said valve means to supply fluid at a proportional pressure, a manual control device operative to supply fluid under pressure to said abutment to actuate same and operative to relieve said abutment of fluid pressure, a second control device comprising a manually operable lever having a certain zone of movement, and means operative by said lever upon movement from one end of said zone to apply pressure to said abutment of a degree which increases in proportion to the extent of movement from said one end of said zone, a piston operable by fluid under pressure to limit movement of said lever from said one end of said zone to a degree less than its full zone of movement and operative upon release of fluid under pressure to render said lever movable through its full zone, and mechanism controlled by said manual control device and operative, upon operation thereof to supply fluid under pressure to actuate said abutment, to also supply fluid under pressure to actuate said piston and operable to release fluid under pressure from said piston upon operation to relieve said abutment of pressure of fluid.

9. In combination, a valve device comprising valve means and a movable abutment operable by pressure to actuate said valve means to supply fluid at a proportional pressure, a manual control device operative to supply fluid under pressure to said abutment to actuate same and operative to relieve said abutment of fluid pressure, a second control device comprising a manually operable lever having a certain zone of movement, and means operative by said lever upon movement from one end of said zone to apply pressure to said abutment of a degree which increases in proportion to the extent of movement from said one end of said zone, and a piston operable by fluid under pressure to limit movement of said lever from said one end of said zone to a degree less than its full zone of movement, and operable upon release of fluid under pressure to render said lever movable through its full zone, said piston being subject to and controlled by pressure of fluid on said abutment.

10. In combination, a valve device comprising valve means and a movable abutment operable by pressure to actuate said valve means to supply fluid at a proportional pressure, a manual control device operative to supply fluid under pressure to said abutment to actuate same and operative to relieve said abutment of fluid pressure, a second control device comprising a manually operable lever having a certain zone of movement, and means operative by said lever upon movement from one end of said zone to apply pressure to said abutment of a degree which increases in proportion to the extent of movement from said one end of said zone, a piston operable by fluid under pressure to limit movement of said lever from said one end of said zone to a degree less than its full zone of movement and operative upon release of fluid under pressure to render said lever movable through its full zone, mechanism controlled by said manual control device and operative, upon operation thereof to supply fluid under pressure to actuate said abutment, to also supply fluid under pressure to actuate said piston and operable to release fluid under pressure from said piston upon operation to relieve said abutment of pressure of fluid, and a cut out valve controlling communication between said manual control device and said abutment, and between said piston and mechanism and operable in one position to open said communication and in another position to close said communication and to release fluid under pressure from said piston.

11. In combination, a valve device comprising valve means and a movable abutment operable by pressure to actuate said valve means to supply fluid at a proportional pressure, a manual control device operative to supply fluid under pressure to said abutment to actuate same and operative to relieve said abutment of fluid pressure, a second control device comprising a manually operable lever having a certain zone of movement, and means operative by said lever upon movement from one end of said zone to apply pressure to said abutment of a degree which increases in proportion to the extent of movement from said one end of said zone, a piston operable by fluid under pressure to limit movement of said lever from said one end of said zone to a degree less than its full zone of movement, and a cut out valve operable in one position to establish communication between said manual control device and said abutment and piston and being operable in a second position to close said communication and to release fluid under pressure from said abutment and piston.

JOHN W. RUSH.
WALTER B. KIRK.

REFERENCES CITED

The following references are of record in the file of this patent:

UNITED STATES PATENTS

| Number | Name | Date |
|---|---|---|
| 1,542,004 | Renshaw | June 16, 1925 |
| 1,682,358 | Sperry | Aug. 28, 1928 |
| 1,764,621 | Good | June 17, 1930 |
| 2,064,864 | Temple | Dec. 22, 1936 |
| 2,125,538 | Boyce | Aug. 2, 1938 |
| 2,254,890 | Gardiner | Sept. 2, 1941 |
| 2,275,255 | Freeman | Mar. 3, 1942 |
| 2,282,194 | Lamond | May 5, 1942 |
| 2,288,173 | Wohanka | June 30, 1942 |
| 2,289,654 | Keel et al. | July 14, 1942 |